A. B. LONGENECKER.
VEHICLE RUNNER.
APPLICATION FILED MAR. 9, 1912.

1,053,616.

Patented Feb. 18, 1913.

Witnesses
P. F. Kohl
Ruth A. Miller

Inventor
Allen B. Longenecker.
By Harry Frease
Attorney

UNITED STATES PATENT OFFICE.

ALLEN B. LONGENECKER, OF SMITHVILLE, OHIO.

VEHICLE-RUNNER.

1,053,616.  Specification of Letters Patent.  Patented Feb. 18, 1913.

Application filed March 9, 1912. Serial No. 682,569.

*To all whom it may concern:*

Be it known that I, ALLEN B. LONGE-NECKER, a citizen of the United States, residing at Smithville, in the county of Wayne and State of Ohio, have invented certain new and useful Improvements in Vehicle-Runners, of which the following is a specification.

The invention relates to sled runners for a wheel vehicle; and the object of the invention is to provide runners which can be engaged with the wheels of the vehicle without the use of bolts or other supplemental clamping devices, and which will leave the rear wheels of the vehicle free for use by a tilting of the vehicle.

The general objects of the invention, thus set forth in general terms, and other ancillary advantages, are attained by the preferred embodiment of the improvement illustrated in the accompanying drawing, forming part hereof, in which—

Figure 1:
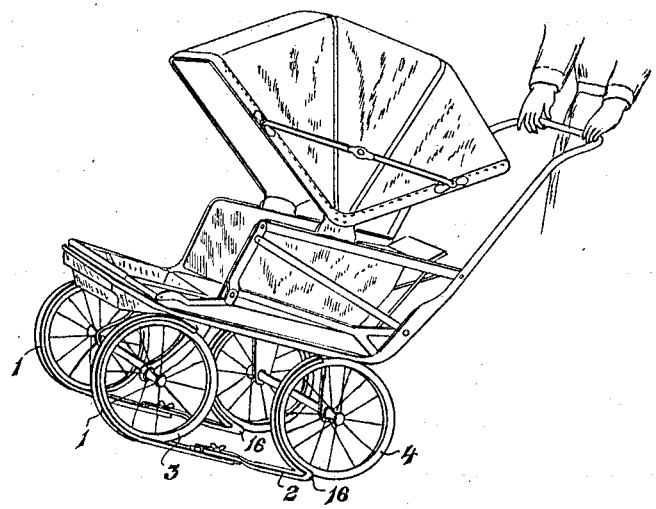
Figure 2:
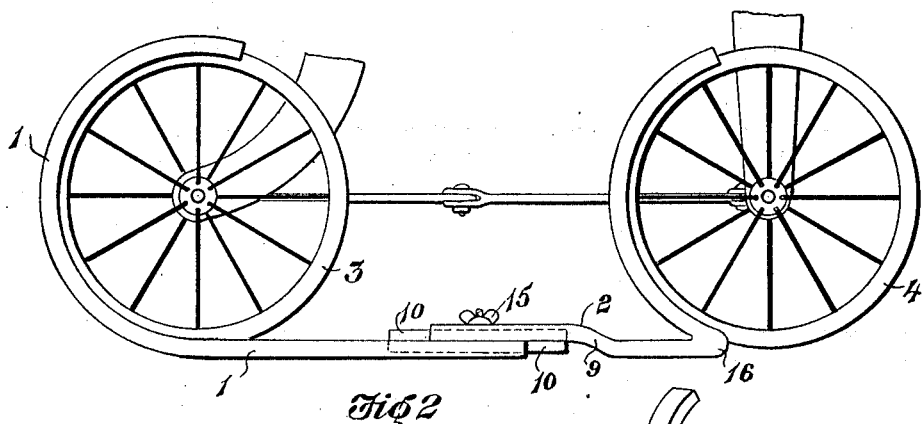
Figure 3:
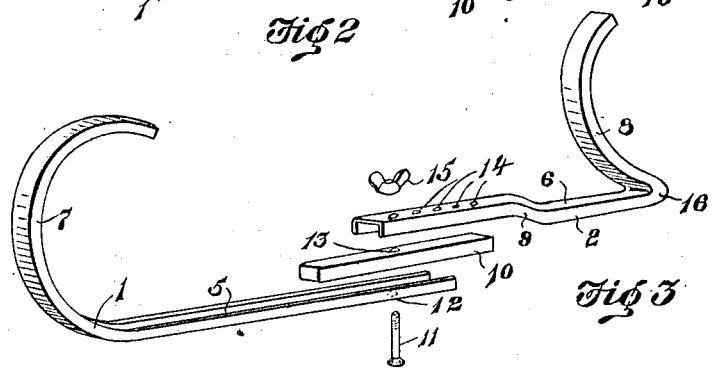
Figure 4:
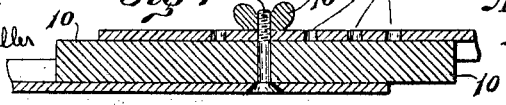

Figure 1 is a perspective view of a baby buggy showing a pair of runners engaged with the wheels, the carriage being tilted for riding on the rear wheels; Fig. 2, a side elevation of the wheels showing the sled runner engaged therewith; Fig. 3, a detached perspective view of the runner parts in relative position for assembling; and Fig. 4, a longitudinal section of the joint between the two sections of one runner.

Similar numerals refer to similar parts throughout the drawing.

Each runner is composed of a forward section 1 and a rear section 2, which sections are preferably connected together by an extensible joint so that a given runner can be adapted to fit differently spaced wheels. The runner sections are made of channel bars with flanges suitably shaped to neatly fit the sides of the rims 3 and 4 of the respective wheels; the tread portion 5 of the forward section having the flanges directed upward, and the tread portion 6 of the rear section having the flanges directed downward.

The wheel engaging portion 7 of the forward section of each runner is curved forward, upward and rearward to embrace by a clamping action more than half the circumference of the rim 3 of the forward wheel, and the rear portion 8 of the rear section of each runner is curved forward, upward and rearward to abut, without clamping, less than half the circumference of the rim 4 of the rear wheel; in each case the flanges of the runner sections fit the sides of the rim.

The tread portions of the runner sections are extended so as to overlap each other, the overlapping part of the rear section being bent as at 9 into a plane above the adjacent tread portion of the forward section, thus bringing the tread portions proper of both sections in the same plane, and the elongated joint block 10 is preferably interposed between the overlapping parts of the sections, which block is shaped to neatly fill the space between the flanges and the webs of the overlapping parts. And finally, the bolt 11 is passed through suitable apertures 12, 13 and 14, in the respective parts, and the joint is completed by the butterfly nut 15; by means of which bolt and nut the parts are clamped together. A plurality of spaced apertures 14 is provided in the overlapping part of the rear section, for an extensible adjustment of the joint; and it is evident that the bearing of the sides of the intervening block against the webs and flanges of the channel bars serves to make a strong, rigid and inflexible joint.

The heel 16 formed by the bending of the rear curved portion of the rear runner section on its tread portion, is located in front of the median line of the rear wheel, so that by tilting the vehicle upward and backward, the vehicle will ride on the rear wheels, which are free to rotate because they are merely abutted but not clamped by the rear runner sections.

It will be noted that the downwardly presented smooth surface of the tread portion of the forward section furnishes a smooth runner for the vehicle, while the downwardly presented flange edges of the tread portion of the rear section serve to prevent a lateral slipping of the vehicle without interfering in any manner with a free forward sliding thereof, and furthermore facilitates a turning of the vehicle. And it is evident that each runner, as a whole, may be readily engaged with or disengaged from the wheels of the vehicle without separating the sections, by slightly springing upward the free end of the curved portion of the forward section to overcome its clamping action upon the corresponding wheel.

I claim:

1. A runner for a wheel vehicle having a portion curved and clamping more than half the rim circumference of the forward wheel and a rear portion freely contacting with the rear wheel.

2. A runner for a wheel vehicle having a forward section engaged with the forward wheel, and a rear section bent upward to form a heel in front of the median line of the rear wheel and curved to abut the forward rim circumference thereof.

3. A runner for a wheel vehicle including a forward section curved and clamping more than half the rim circumference of the forward wheel and a rear section curved to abut less than half the forward rim circumference of the rear wheel.

4. A runner for a wheel vehicle including a forward section curved and clamping more than half the rim circumference of the forward wheel and a rear section curved to abut less than half the forward rim circumference of the rear wheel, with an extensible joint between the sections.

5. A runner for a vehicle including a forward section curved and clamping more than half the rim circumference of the forward wheel and a rear section curved to abut less than half the forward rim circumference of the rear wheel, there being flanges on the sections fitting the sides of the rims.

6. A runner for a wheel vehicle including a forward section curved and clamping more than half the rim circumference of the forward wheel and a rear section curved to abut less than half the forward rim circumference of the rear wheel, the heel of the rear portion being located in front of the median line of the rear wheel.

7. A runner for a wheel vehicle including a forward section curved and clamping more than half the rim circumference of the forward wheel and a rear section curved to abut less than half the forward rim circumference of the rear wheel, there being downwardly presented flanges on the tread portion of the rear section.

8. A runner for a wheel vehicle including a forward section curved and clamping more than half the rim circumference of the forward wheel and a rear section curved to abut less than half the forward rim circumference of the rear wheel, the tread portions of the sections being extended to overlap each other and having opposing channels, a block in the channels, and means for clamping the parts together.

ALLEN B. LONGENECKER.

Witnesses:
RAY F. KOHL,
RUTH A. MILLER.

Copies of this patent may be obtained for five cents each, by addressing the "Commissioner of Patents, Washington, D. C."